(12) United States Patent
Wang

(10) Patent No.: US 10,509,264 B2
(45) Date of Patent: Dec. 17, 2019

(54) CELL ALIGNMENT DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventor: Yang Wang, Beijing (CN)

(73) Assignees: BOE TECHNOLOGY GROUP CO., LTD., Beijing (CN); BEIJING BOE DISPLAY TECHNOLOGY CO., LTD., Beijing (CN)

(*) Notice: Subject to any disclaimer, the term of this patent is extended or adjusted under 35 U.S.C. 154(b) by 134 days.

(21) Appl. No.: 15/520,785

(22) PCT Filed: Nov. 4, 2016

(86) PCT No.: PCT/CN2016/104581
§ 371 (c)(1),
(2) Date: Apr. 20, 2017

(87) PCT Pub. No.: WO2017/118196
PCT Pub. Date: Jul. 13, 2017

(65) Prior Publication Data
US 2018/0088372 A1 Mar. 29, 2018

(30) Foreign Application Priority Data
Jan. 4, 2016 (CN) .......................... 2016 1 0004402

(51) Int. Cl.
*G02F 1/1337* (2006.01)
*G02F 1/1335* (2006.01)
*G02F 1/1333* (2006.01)

(52) U.S. Cl.
CPC ...... *G02F 1/1337* (2013.01); *G02F 1/133528* (2013.01); *G02F 2001/133354* (2013.01); *G02F 2001/133368* (2013.01)

(58) Field of Classification Search
CPC ............. G02F 1/1337; G02F 1/133528; G02F 2001/133354; G02F 2001/133368
(Continued)

(56) References Cited

U.S. PATENT DOCUMENTS 6,362,883 B1 * 3/2002 Watkins ................. G01B 11/00
250/548
2002/0069550 A1 * 6/2002 Noguchi ............ G02F 1/133526
33/623
(Continued)

FOREIGN PATENT DOCUMENTS

CN 1508608 A 6/2004
CN 102681233 A 9/2012
(Continued)

OTHER PUBLICATIONS

International Search Report with English language translation, dated Feb. 6, 2017, international application No. PCT/CN2016/104581. (16 pages).
(Continued)

*Primary Examiner* — Charles S Chang
(74) *Attorney, Agent, or Firm* — Womble Bond Dickinson (US) LLP

(57) ABSTRACT

This disclosure relates to a cell alignment device for aligning a first substrate and a second substrate of a display panel. The cell alignment device comprises: a first platform and a second platform disposed oppositely; a light emitting unit disposed on a surface of the first platform facing the second platform and configured to emit light toward the second platform; a light sensing unit disposed on a surface of the second platform facing the first platform and configured to sense a light intensity of light emitted by the light emitting unit; and a control unit configured to, when the sensed light intensity is greater than or equal to a preset light intensity, adjust a position of at least one of the first platform and the (Continued)

second platform until the sensed light intensity is smaller than the preset light intensity. According to the technical solution of this disclosure, through mutual cooperation between a light emitting unit and a light sensing unit independent of two substrates, alignment conditions of the two substrates can be determined accurately based on a light intensity received by the light sensing unit. Moreover, positions of the two platforms can be adjusted, and thereby the two substrates can be aligned with each other accurately.

20 Claims, 4 Drawing Sheets

(58) Field of Classification Search
USPC .......................................................... 349/158
See application file for complete search history.

(56) References Cited

U.S. PATENT DOCUMENTS

2014/0127962 A1  5/2014  Chen et al.
2014/0167298 A1* 6/2014  Chang .................. G01B 11/272
                                            264/1.34
2014/0300016 A1  10/2014  Sato
2016/0252753 A1  9/2016  Deng et al.

FOREIGN PATENT DOCUMENTS

| | | |
|---|---|---|
| CN | 103268035 A | 8/2013 |
| CN | 103412428 A | 11/2013 |
| CN | 104102090 A | 10/2014 |
| CN | 104904002 A | 9/2015 |
| CN | 105425478 A | 3/2016 |
| JP | S60114822 A | 6/1985 |
| JP | 10-123493 A | 5/1998 |

OTHER PUBLICATIONS

Office Action received for Chinese Patent Application No. 201610004402.8, dated Jan. 2, 2018, 13 pages (6 pages of English Translation and 7 pages of Office Action).

Office Action received for Chinese Patent Application No. 201610004402.8, dated Sep. 10, 2018, 23 pages (12 pages of English Translation and 11 pages of Office Action).

* cited by examiner

CELL ALIGNMENT DEVICE

The present application is the U.S. national phase entry of PCT/CN2016/104581, with an international filing date of Nov. 4, 2016, which claims the benefit of Chinese Patent Application No. 201610004402.8, filed on Jan. 4, 2016, the entire disclosures of which are incorporated herein by reference.

FIELD

This disclosure relates to the field of display technologies, and specifically to a cell alignment device.

BACKGROUND ART

At present, in a production line of a liquid crystal display (LCD), a cell alignment device usually identifies tags in an array substrate and a color filter substrate, and thus aligns the two substrates. However, one problem is that the temperature changes greatly during a film forming procedure of each layer in the array substrate and the color filter substrate. This results in large offsets of the tags in the array substrate and the color filter substrate from respective positions.

That is to say, the cell alignment device mainly achieves alignment of the array substrate and the color filter substrate by identifying tags in the two substrates. Therefore, when respective tags of the array substrate and the color filter substrate have been offset, the device will not be able to perform alignment accurately. In this case, cell alignment can be barely achieved by using algorithms of the device per se, but high accuracy of cell alignment cannot be guaranteed. Accordingly, this will often lead to defects such as light leakage and color shift of the display panel after cell alignment.

SUMMARY

This disclosure provides a cell alignment device for at least improving the accuracy of cell alignment of a cell alignment device for use in a display panel.

According to an embodiment of this disclosure, a cell alignment device for aligning a first substrate and a second substrate of a display panel comprises: a first platform and a second platform disposed oppositely; a light emitting unit disposed on a surface of the first platform facing the second platform and configured to emit light toward the second platform; a light sensing unit disposed on a surface of the second platform facing the first platform and configured to sense a light intensity of light emitted by the light emitting unit; and a control unit configured to, when the sensed light intensity is greater than or equal to a preset light intensity, adjust a position of at least one of the first platform and the second platform until the sensed light intensity is smaller than the preset light intensity. Accordingly, accurate cell alignment of the first substrate and the second substrate is achieved.

According to a specific embodiment, the cell alignment device further comprises: a first polarizer disposed on a surface of the light emitting unit facing the light sensing unit, a transmission axis thereof being in a first direction; and a second polarizer disposed on a surface of the light sensing unit facing the light emitting unit, a transmission axis thereof being in a second direction perpendicular to the first direction. In such a specific embodiment, the cell alignment device is further configured to receive a liquid crystal layer between the first substrate and the second substrate during cell alignment. In this way, due to inherent characteristics of the liquid crystal layer, light polarized in the first direction can be partly converted into light polarized in the second direction and thereby sensed by the light sensing unit.

According to a specific embodiment, the cell alignment device further comprises: a distance sensing unit configured to sense a distance between the first substrate and the second substrate during cell alignment, wherein the light emitting unit and the light sensing unit are activated when the distance is smaller than or equal to a preset distance.

According to a specific embodiment, the control unit is further configured to, when the distance is greater than the preset distance, adjust a position of at least one of the first platform and the second platform according to a first tag in the first substrate and a second tag in the second substrate, so as to pre-align the first substrate with the second substrate.

According to a specific embodiment, the light sensing unit is further configured to detect a position of light when the sensed light intensity is greater than the preset light intensity. In this case, the control unit adjusts a position of at least one of the first platform and the second platform according to the detected position of light.

According to a specific embodiment, the light sensing unit comprises a plurality of light sensing sub-units evenly distributed on a surface of the second platform facing the first platform.

Furthermore, the light emitting unit comprises a plurality of light emitting sub-units corresponding to each of the plurality of light sensing sub-units respectively.

Furthermore, the light emitting unit is an area light source and is configured to emit light with an equal light intensity to each of the plurality of the light sensing sub-units.

According to a further specific embodiment, each of the plurality of light sensing sub-units detects at least one of a position and a light intensity of the sensed light; and the control unit adjusts a position of at least one of the first platform and the second platform according to at least one of the position and the light intensity of light detected by the plurality of light sensing sub-units. Further optionally, the control unit determines an offset condition of the first substrate from the second substrate based on at least one of the position and the light intensity as detected, and thereby adjusts the position of at least one of the first platform and the second platform.

According to a further specific embodiment, each light sensing unit is the same as a pixel of the display panel or a subpixel of the pixel in shape and size.

According to a further specific embodiment, if light is located on a same side of the plurality of light sensing sub-units when the light intensity sensed by the plurality of light sensing sub-units is greater than or equal to the preset light intensity, the control unit translates at least one of the first platform and the second platform. Further optionally, when the light intensity sensed by the plurality of light sensing sub-units is greater than or equal to the preset light intensity, based on the light being located on the same side of the plurality of light sensing sub-units, the control unit determines that there is a translational offset between the first substrate and the second substrate, and thereby translates at least one of the first platform and the second platform.

According to a further specific embodiment, if light is located on different sides of at least two light sensing sub-units when the light intensity sensed by the plurality of light sensing sub-units is greater than or equal to the preset light intensity, the control unit rotates at least one of the first platform and the second platform. Further optionally, when the light intensity sensed by the plurality of light sensing sub-units is greater than or equal to the preset light intensity, based on the light being located on different sides of at least two light sensing sub-units, the control unit determines that there is a rotational offset between the first substrate and the second substrate, and thereby rotates at least one of the first platform and the second platform.

This disclosure further provides a control method for the above device. The control method comprises: when a light intensity sensed by the light sensing unit is greater than or equal to a preset light intensity, adjusting a position of at least one of the first platform and the second platform until the sensed light intensity is smaller than the preset light intensity. Thereby, accurate alignment of the first substrate and the second substrate is achieved.

According to a specific embodiment, the control method further comprises: when a distance between the first substrate and the second substrate is smaller than or equal to a preset distance, activating the light emitting unit and the light sensing unit.

According to a further specific embodiment, the control method further comprises: when the distance is greater than the preset distance, adjusting a position of at least one of the first platform and the second platform according to a first tag in the first substrate and a second tag in the second substrate, so as to pre-align the first substrate with the second substrate.

According to a specific embodiment, the step of adjusting a position of at least one of the first platform and the second platform comprises: adjusting a position of at least one of the first platform and the second platform according to a position where the light is located when the light intensity sensed by the light sensing unit is greater than the preset light intensity.

According to a further specific embodiment, the light sensing unit comprises a plurality of light sensing sub-units, each light sensing unit being the same as a pixel of the display panel or a subpixel of the pixel in shape and size. In this case, the step of adjusting a position of at least one of the first platform and the second platform comprises: if light is located on a same side of the plurality of light sensing sub-units when the light intensity sensed by the plurality of light sensing sub-units is greater than or equal to the preset light intensity, translating at least one of the first platform and the second platform. Alternatively, if light is located on different sides of at least two light sensing sub-units when the light intensity sensed by the plurality of light sensing sub-units is greater than or equal to the preset light intensity, rotating at least one of the first platform and the second platform. Further optionally, translating at least one of the first platform and the second platform, when it is determined that there is a translational offset between the first substrate and the second substrate. Alternatively, rotating at least one of the first platform and the second platform, when it is determined that there is a rotational offset between the first substrate and the second substrate.

According to the above technical solution, through mutual cooperation between a light emitting unit and a light sensing unit independent of two substrates, alignment conditions of the two substrates can be determined accurately based on a light intensity received by the light sensing unit. Moreover, positions of the two substrates can be adjusted, and thereby the two substrates can be aligned with each other accurately.

BRIEF DESCRIPTION OF DRAWINGS

With reference to the drawings, those skilled in the art can understand features and advantages of this disclosure more clearly. The drawings are only illustrative, but should not be construed as limiting this disclosure in any way. In the drawings.

DETAILED DESCRIPTION OF EMBODIMENTS

In order to help understand the above goals, features and advantages of this disclosure more clearly, this disclosure is further depicted below in detail with reference to the drawings and the specific embodiments. It should be noted that embodiments of the present application and features of the embodiments can be combined with each other where no conflicts are caused.

Many specific details are illustrated in the following depictions so as to facilitate full understanding of this disclosure. However, this disclosure can also be implemented in different manners from the one depicted here. Therefore, the protection scope of this disclosure is not limited by the specific embodiments disclosed below.

In each drawing, each component of the cell alignment device according to an embodiment of this disclosure is indicated by the following reference signs respectively: 1—lower platform (also indicated as first platform herein); 2—upper platform (also indicated as second platform herein); 3—first substrate; 31—pixel; 4—second substrate; 5—light emitting unit; 51—light emitting sub-unit; 6—light sensing unit; 61—light sensing sub-unit; 7—first polarizer; and 8—second polarizer.

It should be pointed out that in specific depictions below and drawings appended thereto, the setting of relative positions and the size proportion of each component are shown schematically. However, it should be understood that the positional relationships and the size proportions as shown and depicted are only exemplary, and should not be construed as limiting the scope of this disclosure. Besides, in the specific depictions, each component and relative arrangement thereof are depicted by using directional terms such as "up", "down", "left", "right", "front", "back", "top" and "bottom" with reference to the drawings. However, such depictions are only illustrative, and should not be construed as limiting the scope of this disclosure. Furthermore, in each drawing, various couplings or connections between individual components are indicated by lines such as solid lines and dashed lines. Likewise, the scope of this disclosure is not limited thereto, and benefiting from the teaching of this disclosure, those skilled in the art can easily understand various other equivalent substitutions.

Figure 1:
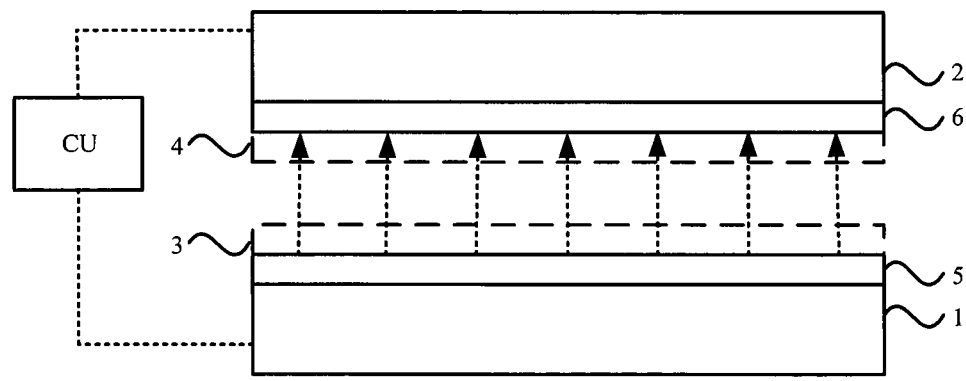
FIG. 1 shows a schematic structure view of a cell alignment device according to an embodiment of this disclosure.

Referring to FIG. 1, a schematic structure view of a cell alignment device according to an embodiment of this disclosure is shown. As shown in FIG. 1, such a cell alignment device for aligning a first substrate and a second substrate of a display panel can comprise: a lower platform 1 and an upper platform 2 disposed oppositely; a light emitting unit 5 disposed on a surface of the lower platform 1 facing the upper platform 2 and configured to emit light toward the upper platform 2 (a general direction of light emission is indicated schematically by dashed arrows in FIG. 1); a light sensing unit 6 disposed on a surface of the upper platform 2 facing the lower platform 1 and configured to sense a light intensity of light emitted by the light emitting unit 5; and a control unit CU configured to, when the sensed light intensity is greater than or equal to a preset light intensity, adjust a position of the lower platform and/or the upper platform until the light intensity is smaller than the preset light intensity. Accordingly, a first substrate 3 and a second substrate 4 are aligned with each other.

The first substrate in this embodiment can be an array substrate, and the second substrate can be a color filter substrate. During the cell alignment procedure, between the array substrate and the color filter substrate a liquid crystal layer (not shown) can be further arranged. Besides, the array substrate can be further provided with a plurality of pixels. And the color filter substrate can be provided with a color resist layer and a black matrix. Specifically, the black matrix is used for blocking adjacent regions of adjacent pixels.

In case that the color filter substrate and the array substrate are aligned with each other, if a light source disposed under the array substrate emits light towards the color filter substrate, the light will only pass through a light emitting region of the pixels and impinge into the liquid crystal layer. Then, the light will impinge on the color filter substrate after deflection by the liquid crystal layer (due to the existence of pre-tilt angles, liquid crystals will exert an optical rotating effect on a portion of the light, when they are not driven upon energization). In this case, the light intensity received by the light sensing unit will be smaller than the preset light intensity.

When the color filter substrate and the array substrate are not aligned, the black matrix is offset from a region it should have blocked in case of alignment, for example, a region in the vicinity of gate lines. Moreover, the region in the vicinity of gate lines is also rugged, so thickness of a polyimide alignment layer under the liquid crystal layer will be uneven. This leads to an alignment disturbance of the liquid crystals in this region and an extremely high light transmittance as well. Therefore, when the black matrix is offset from this region, the light intensity impinging on the color filter substrate through the liquid crystal layer will be greater than or equal to the preset light intensity.

In this embodiment, through mutual cooperation between a light emitting unit and a light sensing unit, whether two substrates are aligned with each other can be determined based on the light intensity of light received by the light sensing unit. Since the light emitting unit and the light sensing unit are disposed on the lower platform and the upper platform respectively, instead of in the first substrate or the second substrate, they will not be influenced by different processes of the first substrate and the second substrate. Consequently, as compared with an existing approach where alignment is performed by using tags, embodiments of this disclosure can determine more accurately whether the two substrates are aligned with each other, and adjust the two substrates based on that, so as to achieve accurate alignment of the two substrates.

It should be noted that positions of the light emitting unit and the light sensing unit in this disclosure can be reversed. That is, the light emitting unit is arranged on the upper platform and the light sensing unit is disposed on the lower platform.

Figure 2:
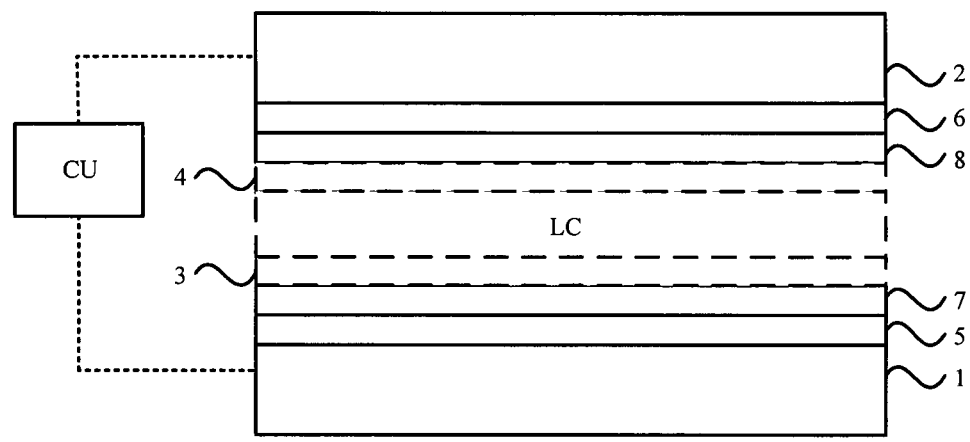
FIG. 2 shows a schematic structure view of another cell alignment device according to an embodiment of this disclosure.

As shown in FIG. 2, in a specific example, the cell alignment device can further comprise: a first polarizer 7 disposed on a surface of the light emitting unit 5 facing the light sensing unit 6 (i.e., on an upper surface of the light emitting unit 5), a transmission axis thereof being in a first direction; and a second polarizer 8 disposed on a surface of the light sensing unit 6 facing the light emitting unit 5 (i.e., a lower surface of the light sensing unit), a transmission axis thereof being in a second direction perpendicular to the first direction. In this case, the cell alignment device can be further configured to receive a liquid crystal layer LC between the first substrate 3 and the second substrate 4. Since two ends of the liquid crystal layer are not energized during alignment, there will be pre-tilt angles in the liquid crystal molecules. Therefore, light polarized in the first direction will be partly converted into light polarized in the second direction, and thereby impinge into the light sensing unit through the second polarizer. Specifically, after passing through the first polarizer, the polarization direction of light emitted by the light emitting unit 5 will be turned into the first direction.

In a further specific embodiment, the cell alignment device can further comprise: a distance sensing unit configured to sense a distance between the first substrate 3 and the second substrate 4, wherein the light emitting unit 5 and the light sensing unit 6 are activated when the sensed distance is smaller than or equal to a preset distance.

Optionally, the control unit can be further configured to, when the sensed distance is greater than the preset distance, adjust a position of the lower platform 1 and/or the upper platform 2 according to a first tag in the first substrate 3 and a second tag in the second substrate 4, so as to pre-align the first substrate 3 with the second substrate 4.

When the first substrate and the second substrate are far from each other, even if the first substrate and the second substrate are not aligned, it is still difficult for the light sensing unit to accurately sense the light intensity of light emitted by the light emitting unit. Therefore, when the distance between the two substrates is large, e.g., greater than the preset distance, the alignment can be achieved by using corresponding tags in the two substrates. On the contrary, when the distance between the two substrates is smaller than or equal to the preset distance (for example, 20 μm), the light emitting unit and the light sensing unit are activated such that they can be brought into full play.

Further optionally, the light sensing unit 6 can be further configured to detect a position where light is located when the sensed light intensity is greater than the preset light intensity. In this case, the control unit can adjust a position of the lower platform 1 and/or the upper platform 2 according to the detected position.

In this embodiment, apart from the light intensity of the sensed light, the light sensing unit can also detect a position of the sensed light. For example, for a position where the light intensity is greater than the preset light intensity, the first substrate can be moved towards this position. If the light intensity in this position becomes even greater, it means that the movement direction was opposite. Based on this, the first substrate is then moved in an opposite direction until the light intensity in this position is smaller than the preset light intensity, and thereby the two substrates are aligned with each other.

Figure 3:
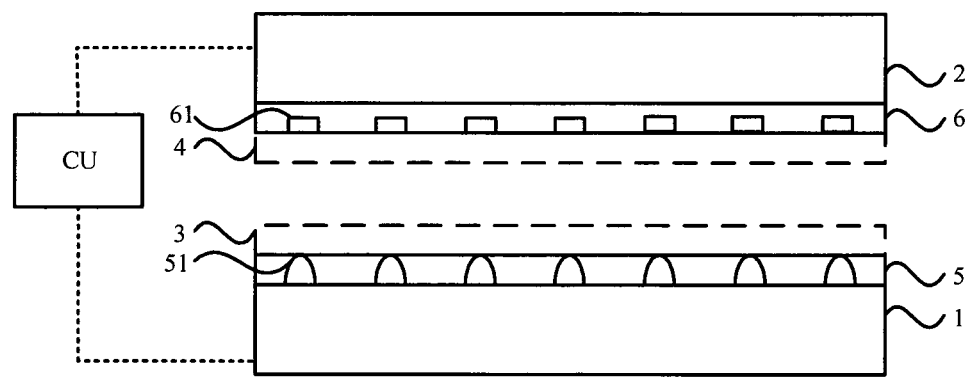
FIG. 3 shows a schematic structure view of yet another cell alignment device according to an embodiment of this disclosure.

As shown in FIG. 3, furthermore, the light sensing unit 6 can comprise a plurality of light sensing sub-units 61 evenly distributed on a lower surface of the upper platform 2.

With a plurality of light sensing sub-units, light intensities of light received in various position of the upper platform can be sensed. Accordingly a position where the received light intensity is greater than the preset light intensity can be detected accurately. Thereby, the first substrate and/or the second substrate can be further adjusted accurately, such as by adjusting the lower platform and/or the upper platform.

Figure 4:
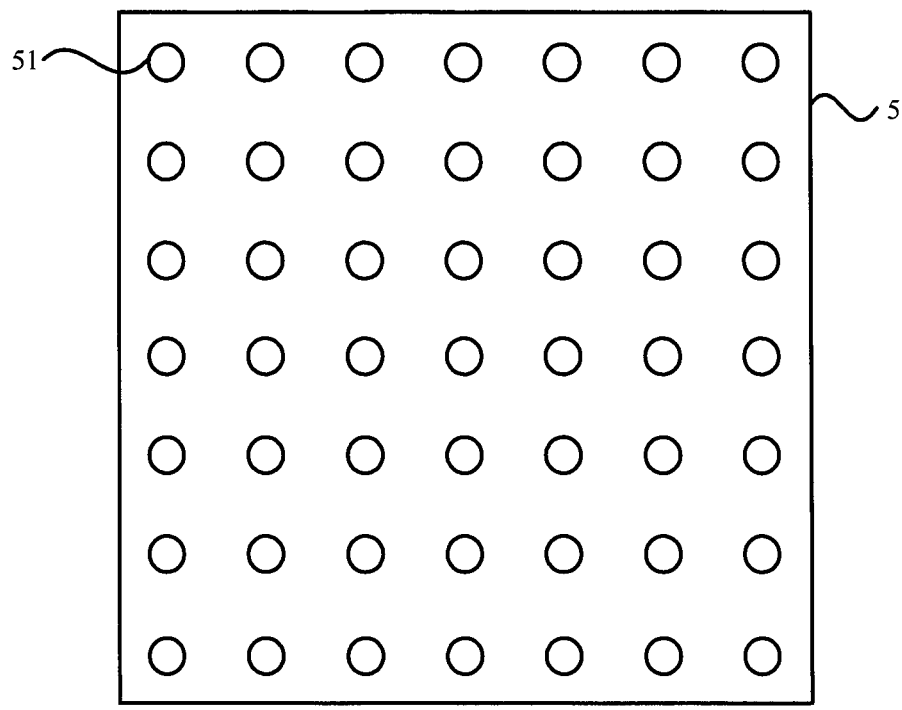
FIGS. 4 and 5 show respectively corresponding schematic views of light emitting sub-units and light sensing sub-units in the cell alignment device according to an embodiment of this disclosure.
Figure 5:
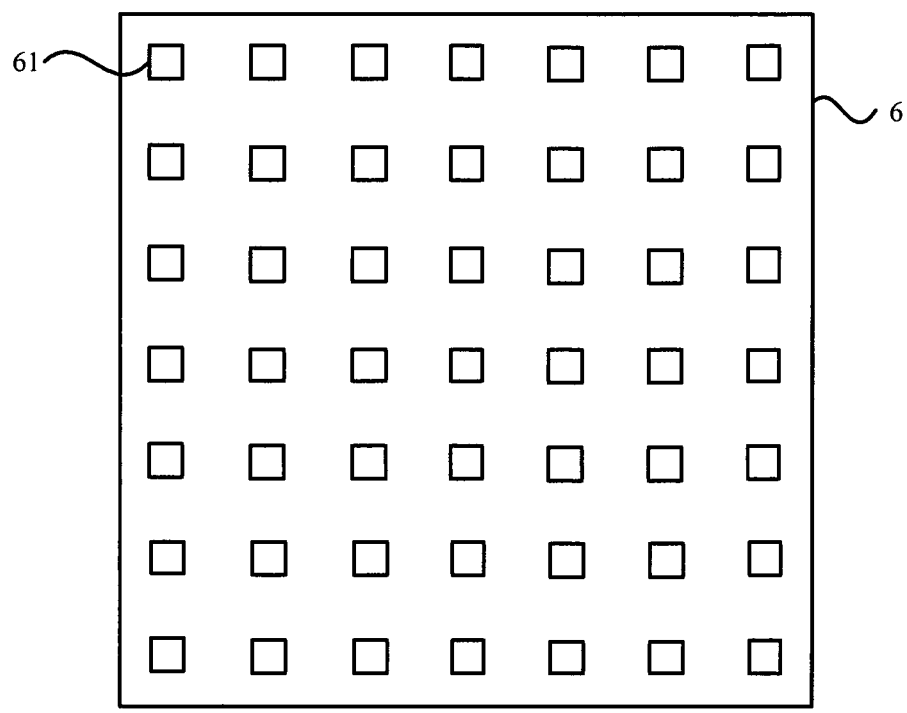

As shown in FIGS. 3, 4 and 5, furthermore, the light emitting unit 5 can comprise a plurality of light emitting sub-units 51 corresponding to each of the plurality of light sensing sub-units 61 respectively.

Optionally, the light emitting unit 5 can comprise an area light source and be configured to emit light having an equal light intensity to each of the light sensing sub-units 61.

With a plurality of light emitting sub-units or an area light source, it can be ensured that each light sensing unit receives an equal light intensity when the two substrates are aligned with each other. Therefore, when the two substrates are not aligned, a position where the light intensity is greater than the preset light intensity can be accurately detected.

Specifically, each light emitting sub-unit can be in the same order as pixels in the display panel. For example, they can be the same in shape and size. In this way, when the color filter substrate is offset rightwards relative to the array substrate, the light intensity sensed in a left region of the light emitting sub-units will be greater than the preset light intensity. Based on this, the position where the received light intensity is greater than the preset light intensity can be detected accurately. Thereby the first substrate and/or the second substrate can be adjusted accurately.

Optionally, each of the plurality of light sensing sub-units 61 can detect a position and/or a light intensity of the sensed light. In this case, the control unit CU can be further configured to determine an offset condition of the first substrate 3 from the second substrate 4 based on the position and/or the light intensity detected by the plurality of light sensing sub-units 61, and thereby adjust a position of the lower platform 1 and/or the upper platform 2 based on the offset condition.

There can be many offset conditions of the first substrate with respect to the second substrate. For example, the first substrate rotates relative to the second substrate, or the first substrate translates relative to the second substrate. So by adopting a corresponding way of adjustment for each offset condition, the first substrate and the second substrate can be aligned with each other more rapidly and more effectively.

Figure 6:
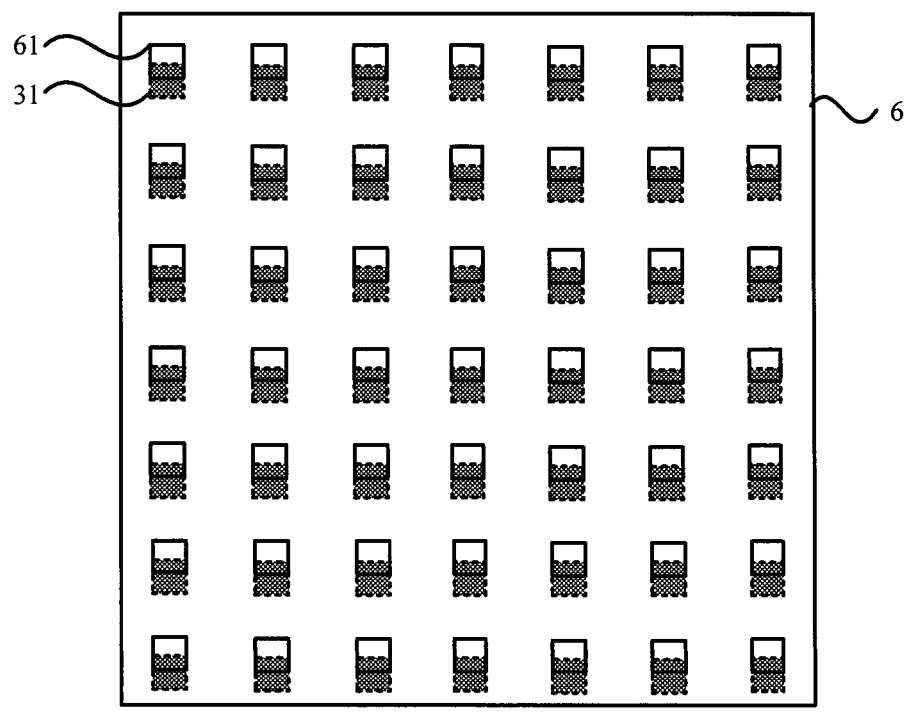
FIG. 6 shows a schematic view of positional relationships between the light sensing unit in the cell alignment device according to an embodiment of this disclosure and pixels of a display panel to be aligned.
Figure 7:
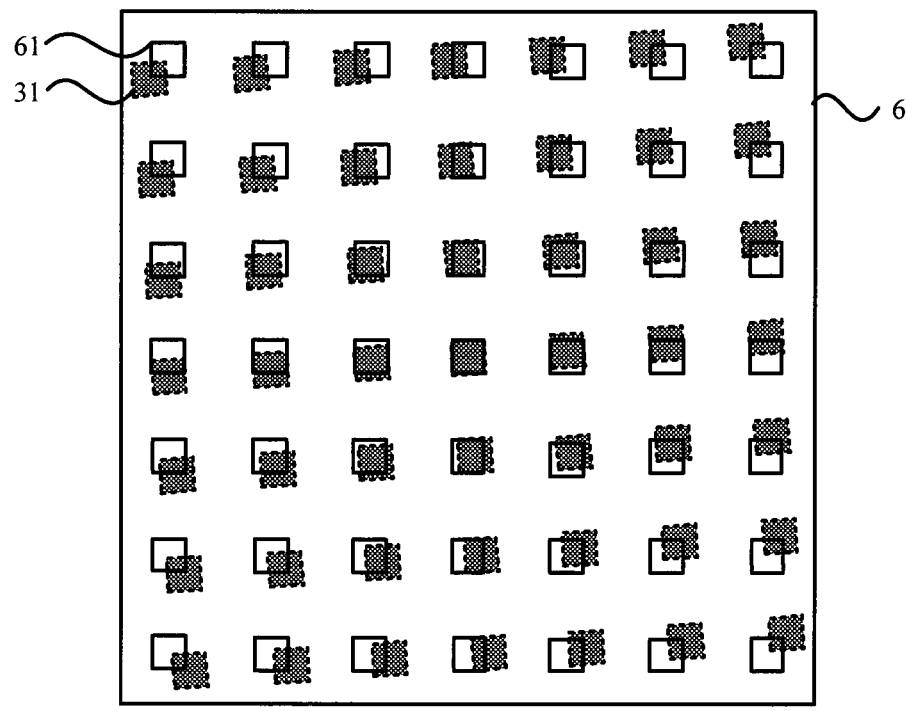
FIG. 7 shows another schematic view of positional relationships between the light sensing unit in the cell alignment device according to an embodiment of this disclosure and pixels of a display panel to be aligned.

As shown in FIGS. 6 and 7, furthermore, each light sensing unit is the same as a pixel or a subpixel of the pixel in shape and size. Actually, the light sensing unit can be designed in the same order as the pixel or the subpixel upon needs. For example, an area of the light sensing unit is 0.5~2 times that of the pixel or the subpixel.

Optionally, if light is located on a same side of the plurality of light sensing sub-units 61 when the light intensity sensed by the plurality of light sensing sub-units 61 is greater than or equal to the preset light intensity, it is determined that there is a translational offset between the first substrate 3 and the second substrate 4. Thereby the lower platform 1 and/or the upper platform 2 will be translated.

As shown in FIG. 6, light is located above the light sensing sub-units 61 when the light intensity sensed by the plurality of light sensing sub-units 61 is greater than or equal to the preset light intensity. Based on that, it can be determined that pixels 31 are offset downwards relative to the light sensing subunits 61. That is, the first substrate 3 is translationally offset downwards relative to the second substrate 4. Based on this position, the first substrate can be adjusted upwards by means of the upper platform. Of course, the second substrate can also be adjusted downwards by means of the lower platform. In this way, the first substrate is aligned with the second substrate.

Optionally, if light is located on different sides of at least two light sensing sub-units 61 when the light intensity sensed by the plurality of light sensing sub-units 61 is greater than or equal to the preset light intensity, it is determined that there is a rotational offset between the first substrate 3 and the second substrate 4. Thereby the lower platform 1 and/or the upper platform 2 will be rotated.

As shown in FIG. 7, the light is located on different sides of at least two light sensing sub-units 61 when the light intensity sensed by the plurality of light sensing sub-units 61 is greater than or equal to the preset light intensity. Based on that, it can be determined that pixels 31 are offset rotationally relative to the light sensing subunits 61. Accordingly, the first substrate 3 and/or the second substrate 4 can be rotated by means of the lower platform 1 and/or the upper platform 2, such that the first substrate 3 is aligned with the second substrate 4.

Obviously, it is also possible that the first substrate and the second substrate are offset both translationally and rotationally. In this case, comprehensive adjustment can be specifically performed by combining the above two ways.

It should be noted that the light sensing sub-units in this embodiment can consist of a plurality of photosensitive elements, such as photodiodes and phototransistors. For example, when pixels in the array substrate are rectangular, the light sensing sub-units can also be rectangular, and a photosensitive element can be arranged on each side of the rectangle respectively. For example, if a current generated from photosensitization by photosensitive elements above the plurality of light sensing sub-units is greater than a preset current value, it can be determined that there is a translational offset between the first substrate and the second substrate. For example, in a plurality of light sensing sub-units, there are both light sensing sub-units in which a current generated from photosensitization by upper and left photosensitive elements is greater than a preset current value, and light sensing sub-units in which a current generated from photosensitization by lower and right photosensitive elements is greater than a preset current value. In this case, it can be determined that there is a rotational offset between the first substrate and the second substrate. Of course, in order to improve the determining accuracy, a plurality of photosensitive elements can also be arranged on each side of the light sensing sub-units.

In a display device manufactured according to an embodiment of this disclosure, light leakage is rare, and thereby a good viewing quality can be guaranteed. It should be noted that the display device in this embodiment can be any product or component having a display function, such as electronic paper, a handset, a tablet computer, a television, a notebook computer, a digital photo frame, a navigator and the like.

Figure 8:
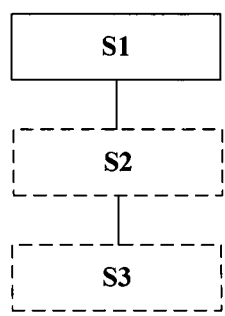
FIG. 8 shows a schematic flow diagram of a control method for the cell alignment device according to an embodiment of this disclosure.

This disclosure further provides a control method for the above device. Specifically, referring to FIG. 8, a schematic flow diagram of such a control method is shown. According to a specific embodiment, the control method for the cell alignment device can comprise: step S1, when a light intensity sensed by the light sensing unit is greater than or equal to a preset light intensity, adjusting a position of the lower platform and/or the upper platform until the light intensity is smaller than the preset light intensity. Thereby the first substrate and the second substrate are accurately aligned.

Furthermore, the method can further comprise: step S2, when a distance between the first substrate and the second substrate is smaller than or equal to a preset distance, activating the light emitting unit and the light sensing unit.

Furthermore, the method can further comprise: step S3, when the distance between the first substrate and the second substrate is greater than the preset distance, adjusting a position of the lower platform and/or the upper platform according to a first tag in the first substrate and a second tag in the second substrate, so as to pre-align the first substrate with the second substrate.

Optionally, the step S1 of adjusting a position of the lower platform and/or the upper platform can comprise the following sub-step: adjusting a position of the lower platform and/or the upper platform according to a position where the light is located when the light intensity sensed by the light sensing unit is greater than the preset light intensity.

Optionally, the light sensing unit can comprise a plurality of light sensing sub-units, each light sensing unit being the same as a pixel of the display panel or a subpixel of the pixel in shape and size. In this case, the step S1 of adjusting a position of the lower platform and/or the upper platform can further comprise the following sub-step: if light is located on a same side of the plurality of light sensing sub-units when the light intensity sensed by the plurality of light sensing sub-units is greater than or equal to the preset light intensity, determining that there is a translational offset between the first substrate and the second substrate, and thereby translating the lower platform and/or the upper platform; and if light is located on different sides of at least two light sensing sub-units when the light intensity sensed by the plurality of light sensing sub-units is greater than or equal to the preset light intensity, determining that there is a rotational offset between the first substrate and the second substrate, and thereby rotating the lower platform and/or the upper platform.

The technical solution of this disclosure has been illustrated above in detail with reference to the drawings. As compared to the low accuracy of cell alignment by using corresponding tags in an array substrate and a color filter substrate in an existing approach, the technical solution of this disclosure achieves relatively high accuracy of cell alignment. Specifically, through mutual cooperation between a light emitting unit and a light sensing unit independent of the two substrates, alignment conditions of the two substrates can be determined accurately based on a light intensity of light received by the light sensing unit. Moreover, positions of the two substrates can be adjusted. Thereby, the two substrates can be aligned with each other accurately.

It should be pointed out that sizes of the layers and the regions may be exaggerated in the drawings for clarity of the illustration. It can be understood that when an element or a layer is depicted as being located "above" a further element or layer, this means that it can be disposed above the further element or layer directly, or with an intermediate layer. Besides, it can be understood that when an element or a layer is depicted as being located "below" a further element or layer, this means that it can be disposed below the further element or layer directly, or with more than one intermediate layer or element. In addition, it can also be understood that when a layer or an element is depicted as being located "between" two layers or two elements, this means that it can be the only layer between the two layers or two elements, or with more than one intermediate layer or element present. Throughout the description, similar reference signs indicate similar elements.

In this disclosure, terms such as "first" and "second" are only used for descriptive purposes and should not be understood as indicating or implying relative importance. Unless otherwise explicitly defined, the term "multiple" means two or more.

The above contents are only preferred embodiments of this disclosure, but not intended to limit this disclosure. For those skilled in the art, this disclosure can have various modifications and variants. Any modification, equivalent substitution and improvement made within spirits and principles of this disclosure shall fall within the protection scope of this disclosure.

The invention claimed is:

1. A cell alignment device for aligning a first substrate and a second substrate of a display panel, comprising:
    a first platform and a second platform disposed oppositely;
    a light emitting unit disposed on a surface of the first platform facing the second platform and configured to emit light toward the second platform;
    a light sensing unit disposed on a surface of the second platform facing the first platform and configured to sense a light intensity of light emitted by the light emitting unit; and
    a control unit configured to, when the sensed light intensity is greater than or equal to a preset light intensity, adjust a position of at least one of the first platform and the second platform until the sensed light intensity is smaller than the preset light intensity, wherein
    the cell alignment device is further configured to receive the first substrate on a surface of the light emitting unit facing the light sensing unit and receive the second substrate on a surface of the light sensing unit facing the light emitting unit during cell alignment.

2. The cell alignment device according to claim 1, further comprising:
    a first polarizer disposed on a surface of the light emitting unit facing the light sensing unit, a transmission axis thereof being in a first direction; and
    a second polarizer disposed on a surface of the light sensing unit facing the light emitting unit, a transmission axis thereof being in a second direction perpendicular to the first direction, wherein
    the cell alignment device is further configured to receive a liquid crystal layer between the first substrate and the second substrate during cell alignment.

3. The cell alignment device according to claim 1, further comprising:
    a distance sensing unit configured to sense a distance between the first substrate and the second substrate during cell alignment, wherein
    the light emitting unit and the light sensing unit are activated when the distance is smaller than or equal to a preset distance.

4. The cell alignment device according to claim 3, wherein
    the control unit is further configured to, when the distance is greater than the preset distance, adjust a position of at least one of the first platform and the second platform according to a first tag in the first substrate and a second tag in the second substrate, so as to pre-align the first substrate with the second substrate.

5. The cell alignment device according to claim 1, wherein
the light sensing unit is further configured to detect a position of light when the sensed light intensity is greater than the preset light intensity; and
the control unit adjusts a position of at least one of the first platform and the second platform according to the detected position of light.

6. The cell alignment device according to claim 5, wherein
the light sensing unit comprises a plurality of light sensing sub-units evenly distributed on a surface of the second platform facing the first platform.

7. The cell alignment device according to claim 6, wherein
the light emitting unit comprises a plurality of light emitting sub-units corresponding to each of the plurality of light sensing sub-units respectively.

8. The cell alignment device according to claim 7, wherein
each of the plurality of light sensing sub-units detects at least one of a position and a light intensity of the sensed light; and
the control unit adjusts a position of at least one of the first platform and the second platform according to at least one of the position and the light intensity of light detected by the plurality of light sensing sub-units.

9. The cell alignment device according to claim 8, wherein
each light sensing unit is the same as a pixel of the display panel or a subpixel of the pixel in shape and size.

10. The cell alignment device according to claim 9, wherein
if light is located on a same side of the plurality of light sensing sub-units when the light intensity sensed by the plurality of light sensing sub-units is greater than or equal to the preset light intensity, the control unit translates at least one of the first platform and the second platform.

11. The cell alignment device according to claim 9, wherein
if light is located on different sides of at least two light sensing sub-units when the light intensity sensed by the plurality of light sensing sub-units is greater than or equal to the preset light intensity, the control unit rotates at least one of the first platform and the second platform.

12. The cell alignment device according to claim 6, wherein
the light emitting unit comprises an area light source and is configured to emit light with an equal light intensity to each of the plurality of the light sensing sub-units.

13. The cell alignment device according to claim 12, wherein
each of the plurality of light sensing sub-units detects at least one of a position and a light intensity of the sensed light; and
the control unit adjusts a position of at least one of the first platform and the second platform according to at least one of the position and the light intensity of light detected by the plurality of light sensing sub-units.

14. A control method for the cell alignment device according to claim 1, comprising:
when a light intensity sensed by the light sensing unit is greater than or equal to a preset light intensity, adjusting a position of at least one of the first platform and the second platform until the sensed light intensity is smaller than the preset light intensity.

15. The control method according to claim 14, further comprising:
when a distance between the first substrate and the second substrate is smaller than or equal to a preset distance, activating the light emitting unit and the light sensing unit.

16. The control method according to claim 14, further comprising:
when the distance between the first substrate and the second substrate is greater than the preset distance, adjusting a position of at least one of the first platform and the second platform according to a first tag in the first substrate and a second tag in the second substrate, so as to pre-align the first substrate with the second substrate.

17. The control method according to claim 14, wherein
the step of adjusting a position of at least one of the first platform and the second platform comprises:
adjusting a position of at least one of the first platform and the second platform according to a position where the light is located when the light intensity sensed by the light sensing unit is greater than the preset light intensity.

18. The control method according to claim 17, wherein
the light sensing unit comprises a plurality of light sensing sub-units, each light sensing unit being the same as a pixel of the display panel or a subpixel of the pixel in shape and size, and
the step of adjusting a position of at least one of the first platform and the second platform comprises:
if light is located on a same side of the plurality of light sensing sub-units when the light intensity sensed by the plurality of light sensing sub-units is greater than or equal to the preset light intensity, translating at least one of the first platform and the second platform; and
if light is located on different sides of at least two light sensing sub-units when the light intensity sensed by the plurality of light sensing sub-units is greater than or equal to the preset light intensity, rotating at least one of the first platform and the second platform.

19. The control method according to claim 14, wherein the cell alignment device further comprises:
a first polarizer disposed on a surface of the light emitting unit facing the light sensing unit, a transmission axis thereof being in a first direction; and
a second polarizer disposed on a surface of the light sensing unit facing the light emitting unit, a transmission axis thereof being in a second direction perpendicular to the first direction, wherein
the cell alignment device is further configured to receive a liquid crystal layer between the first substrate and the second substrate during cell alignment.

20. The control method according to claim 14, wherein the cell alignment device further comprises:
a distance sensing unit configured to sense a distance between the first substrate and the second substrate during cell alignment, wherein
the light emitting unit and the light sensing unit are activated when the distance is smaller than or equal to a preset distance.

\* \* \* \* \*